(No Model.)
P. H. YAWMAN.
FISHING REEL.
No. 454,319. Patented June 16, 1891.
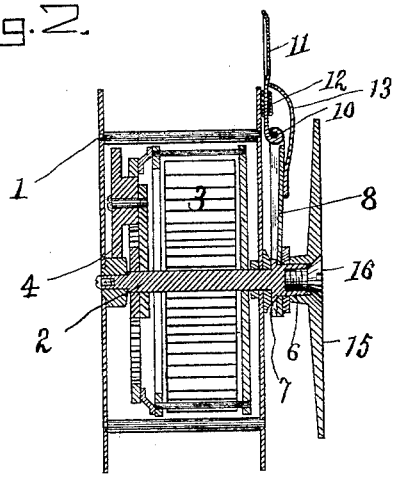
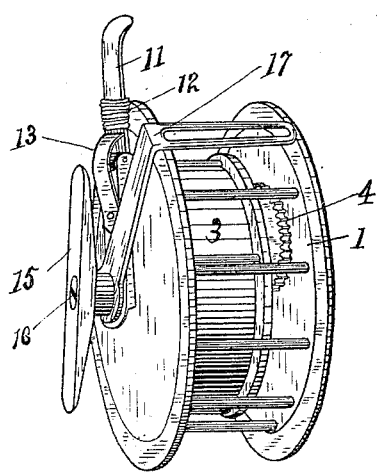
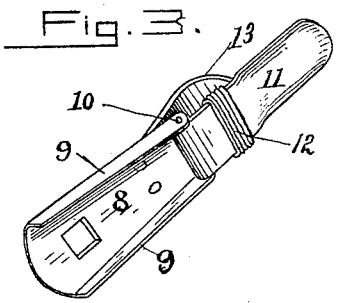
WITNESSES:
Fred F. Church.
Gilbert S. Dey.
INVENTOR,
Philip H. Yawman
BY Church & Church
ATTORNEY.

United States Patent Office.

PHILIP H. YAWMAN, OF ROCHESTER, NEW YORK.

FISHING-REEL.

SPECIFICATION forming part of Letters Patent No. 454,319, dated June 16, 1891.

Application filed February 16, 1891. Serial No. 381,637. (No model.)

*To all whom it may concern:*

Be it known that I, PHILIP H. YAWMAN, of Rochester, in the county of Monroe and State of New York, have invented certain new and useful Improvements in Fishing-Reels; and I do hereby declare the following to be a full, clear, and exact description of the same, reference being had to the accompanying drawings, forming a part of this specification, and to the figures of reference marked thereon.

My present invention relates particularly to automatic fishing-reels—that is to say, those in which the reel is rotated and the line wound up by a spring—the rotation of said reel being governed by a brake controlled by the operator; and it has for its object to provide an improved brake for said reels (though equally as well adapted to reels not automatic) which shall be simple and cheap in construction, certain in operation, and readily applied; and to these ends it consists in certain novelties of construction and combinations of parts, all as will be hereinafter fully described, and the novel features pointed out in the claims at the end of this specification.

In the drawings, Figure 1 is a perspective view of a reel provided with my improvements; Fig. 2, a sectional view of the same applied to the butt of a fishing-rod; Fig. 3, a view of the brake-plate removed.

Similar figures of reference indicate similar parts.

The reel proper on which the line is wound is indicated in the drawings by 1, the shaft or spindle on which it rotates by 2, and the spring 3 is connected through suitable gearing 4 with the reel 1, the construction of these parts being, as usual in this class of devices, arranged to rotate the reel and automatically take up the slack in the line when released. The spindle 2 is provided with a squared end 6 and a shoulder 7, against which latter fits the brake-supporting plate 8, the construction of which and of the brake forms the subject-matter of my present invention. This plate is provided with the flanges 9 at the sides, serving to stiffen it, and at the ends are formed ears, through which a pin 10 is passed forming a bearing for the brake-lever 11, the latter having its inner end bent around said pin, while its outer end is formed into a finger-piece or handle, and intermediate the ends is preferably arranged a shoe or pad 12, formed of cord, leather, or other suitable material, arranged to engage the reel proper near its outer edge, as shown.

Mounted upon the plate 8 below the pivot of the brake is a spring 13, curved outward and then inward, as shown, with its end bearing upon the outer side of the brake near its pivot and serving to press and hold it firmly against the reel side. This spring, being short, enables me to provide an efficient brake to the reel and one that can readily be released by pressure on the outer end, which may be extended more than is shown, if desired, thereby allowing the reel-spring to wind up the line. The outer end of spindle 2 fits within a socket in the base-plate 15, attached to the fishing-rod in the usual manner, being secured by a screw 16, and it is between this plate 15 and the shoulder 7 that the brake-plate 8 and line-guide 17 are firmly clamped by tightening up the screw 16.

The manner of using the reel is so well known as not to require further description, it being sufficient to say that the end of the brake-lever projects in proximity to the rod-handle, so that the fisherman may manipulate it with the little finger of the hand holding the rod, thereby allowing the reel-spring to take up the slack in the line.

This brake-plate and brake are very simple and can be made cheaply and readily applied, and the spring, being short and operating near the brake-lever, is not liable to take a permanent set and fail to hold the reel, as would be the case with a long single spring-plate, while the lever-handle may be extended to insure the easy release.

While this form of brake is particularly adapted for use on an automatic reel, such as described, it is evident that it could be as well applied to reels wound by hand, the brake being used to regulate the paying out of the line, as usual.

I claim as my invention—

1. In a reel, the combination, with the spindle and the reel thereon, of the rigid brake-plate secured to the spindle, the brake-lever pivoted on said plate and adapted to co-operate with the side of the reel and movable in a plane at right angles to the axis of the latter, and the spring rigidly secured to the plate at one end and bearing on the brake-lever at the other, substantially as described.

2. In a reel, the combination, with the spindle on which the reel proper revolves, of the brake-plate, the brake-lever pivoted thereon, the pad on the lever co-operating with the side of the reel, the spring operating on the said lever, and the reel-supporting plate secured to the spindle, between which and the latter the brake-plate is secured, substantially as described.

3. In a reel, the combination, with the spindle on which the reel revolves, of the brake-plate secured thereto, having the flanges at the sides and the ears, the brake-lever pivoted between the ears, and the spring secured to the plate and bearing on the brake-lever, substantially as described.

PHILIP H. YAWMAN.

Witnesses:
FRED F. CHURCH,
A. A. DAVIS.